(12) United States Patent
Baker (10) Patent No.: US 11,358,658 B2
(45) Date of Patent: Jun. 14, 2022

(54) ROTATABLE TRAILER BED

(71) Applicant: Jamie Baker, Madison, TN (US)

(72) Inventor: Jamie Baker, Madison, TN (US)

(*) Notice: Subject to any disclaimer, the term of this patent is extended or adjusted under 35 U.S.C. 154(b) by 0 days.

(21) Appl. No.: 17/391,443

(22) Filed: Aug. 2, 2021

(65) Prior Publication Data

US 2022/0033016 A1 Feb. 3, 2022

Related U.S. Application Data

(60) Provisional application No. 63/059,744, filed on Jul. 31, 2020.

(51) Int. Cl.
*B62D 63/08* (2006.01)
*B62D 53/06* (2006.01)
*B60P 3/00* (2006.01)
*B62D 21/20* (2006.01)

(52) U.S. Cl.
CPC ........... *B62D 53/061* (2013.01); *B62D 63/08* (2013.01); *B60P 3/002* (2013.01); *B62D 21/20* (2013.01); *B62D 53/06* (2013.01)

(58) Field of Classification Search
CPC .............................. B62D 53/061; B62D 63/08
See application file for complete search history.

(56) References Cited

U.S. PATENT DOCUMENTS

| | | | |
|---|---|---|---|
| 3,536,214 A | 10/1970 | Sorg | |
| 3,720,336 A | 3/1973 | Murray et al. | |
| 3,868,083 A | 2/1975 | Titcombe | |
| 3,945,521 A | 3/1976 | Decker | |
| 6,386,819 B1 | 5/2002 | Schultz | |
| 7,427,183 B2* | 9/2008 | Stabeno | B60P 3/122 414/482 |
| 8,403,353 B2* | 3/2013 | Fink | B60P 3/1033 280/414.1 |
| 9,517,713 B2 | 12/2016 | Honigsberg | |
| 10,905,106 B2* | 2/2021 | Calabria | B60P 3/04 |
| 11,085,266 B2* | 8/2021 | Thomeer | E21B 33/068 |
| 2004/0120799 A1 | 6/2004 | Kessler | |
| 2006/0245877 A1 | 11/2006 | Stabeno | |
| 2010/0092271 A1 | 4/2010 | Richardson | |
| 2015/0158333 A1 | 6/2015 | Turba | |

OTHER PUBLICATIONS

Konopak et al., "Make a Revolving Stage," http://theaterdad.blogspot.com/2011/06/how-to-make-revolving-stage.html.

* cited by examiner

*Primary Examiner* — Jacob D Knutson
*Assistant Examiner* — Marlon A Arce (57) ABSTRACT

A rotatable trailer bed includes a frame, a trailer bed, a turntable swivel assembly, and a plurality of swivel casters. The frame includes a bed section, a hitch section, and two wheel sets. The hitch section is adjacently connected a front end of the bed section. The two wheel sets is rotatably mounted to the bed section. The plurality of swivel casters is mounted to the bed section is perimetrically positioned around the bed section. The trailer bed is rotatably mounted to the bed section through the turntable swivel assembly as the plurality of swivel casters maintain the balance and level of the trailer bed.

8 Claims, 13 Drawing Sheets

ROTATABLE TRAILER BED

The current application claims a priority to the U.S. Provisional Patent application Ser. No. 63/059,744 filed on Jul. 31, 2020.

FIELD OF THE INVENTION

The present invention relates generally to trailers. More specifically, the present invention is a rotatable trailer bed that can rotate 360-degrees to ease loading and unloading of cargo.

BACKGROUND OF THE INVENTION

A trailer is an unpowered vehicle towed by a powered vehicle, commonly used for the transport of goods and materials, motorcycles and other recreational vehicles, livestock, and other types of material that need to be transported. The trailer is generally hitched to the powered vehicle through a tow hitch, fifth wheel coupling, or any types of mounting system to be pulled. The overall body of the trailer can differ depending upon the type of the trailer. For example, motorcycle carrying trailers may be open or enclosed and may also comprise lift or ramp mechanisms to allow for a more accessible stage. Utility trailers are generally opened to accommodate different heights of the cargo; however, they can also be functioned as enclosed trailers. Livestock trailers are generally enclosed to protect the animals but has openings at approximately the eye level of the animals to allow ventilation. Most of the existing trailers are fixed trailers, wherein the front side of the fixed trailer is positioned adjacent to the powered vehicle and the rear side of the trailer is utilized as the entrance to load and unload cargo. Depending upon the type of cargo, such as motorcycle and livestock, the single entry point of the cargo loading and unloading can create difficulties with the existing trailers.

It is therefore an objective of the present invention to provide a rotatable trailer bed that can rotate 360-degrees. As a result, the present invention is equipped with two entry/exit opening at the front side and the rear side. As a result, the present invention ease loading and unloading of cargo. For example, a motorcycle can be loaded to the present invention through the rear side of the trailer bed. When the motorcycle need to be unloaded, the trailer bed is rotated 180 degrees so that the front side of the trailer can be utilized to unload the motorcycle in the forward direction. Due to the rotational aspect of the present invention, the user never has to push the motorcycle in the reverse direction.

DETAIL DESCRIPTIONS OF THE INVENTION

All illustrations of the drawings are for the purpose of describing selected versions of the present invention and are not intended to limit the scope of the present invention.

Figure 1:
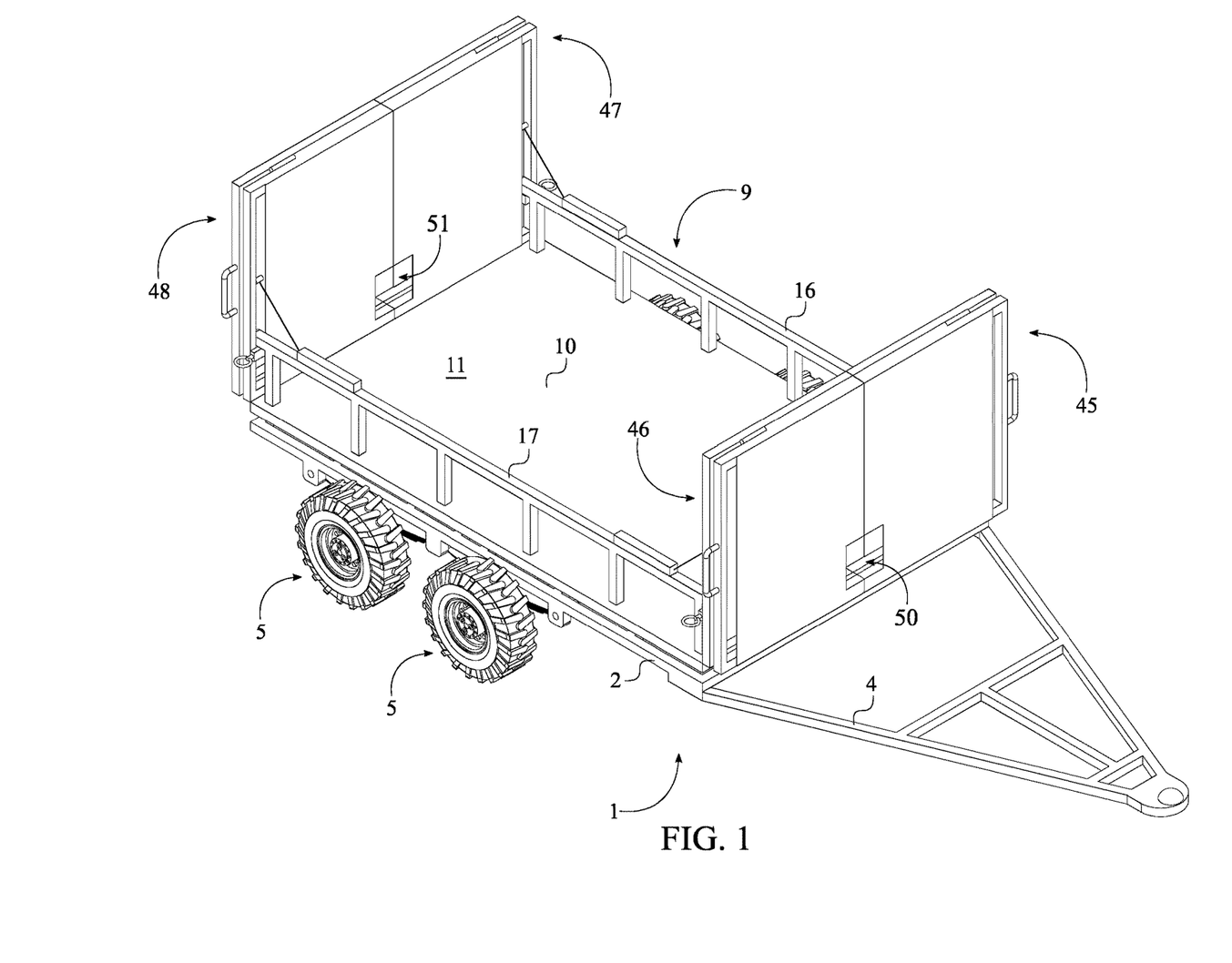
FIG. 1 is a perspective view of the present invention, wherein the first front foldable door and the second front foldable door are positioned adjacent and parallel to the front end of the frame.
Figure 2:
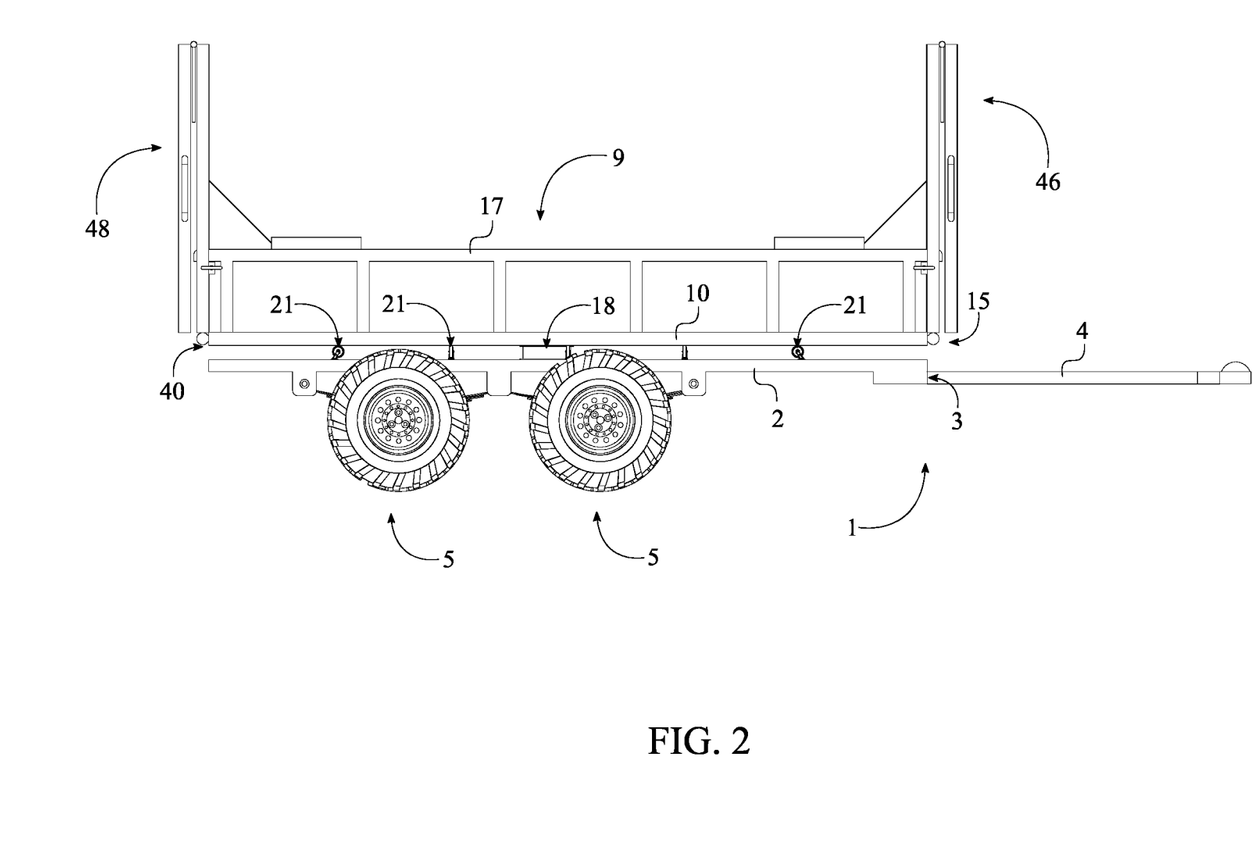
FIG. 2 is a side view of the present invention, wherein the first front foldable door and the second front foldable door are positioned adjacent and parallel to the front end of the frame.
Figure 3:
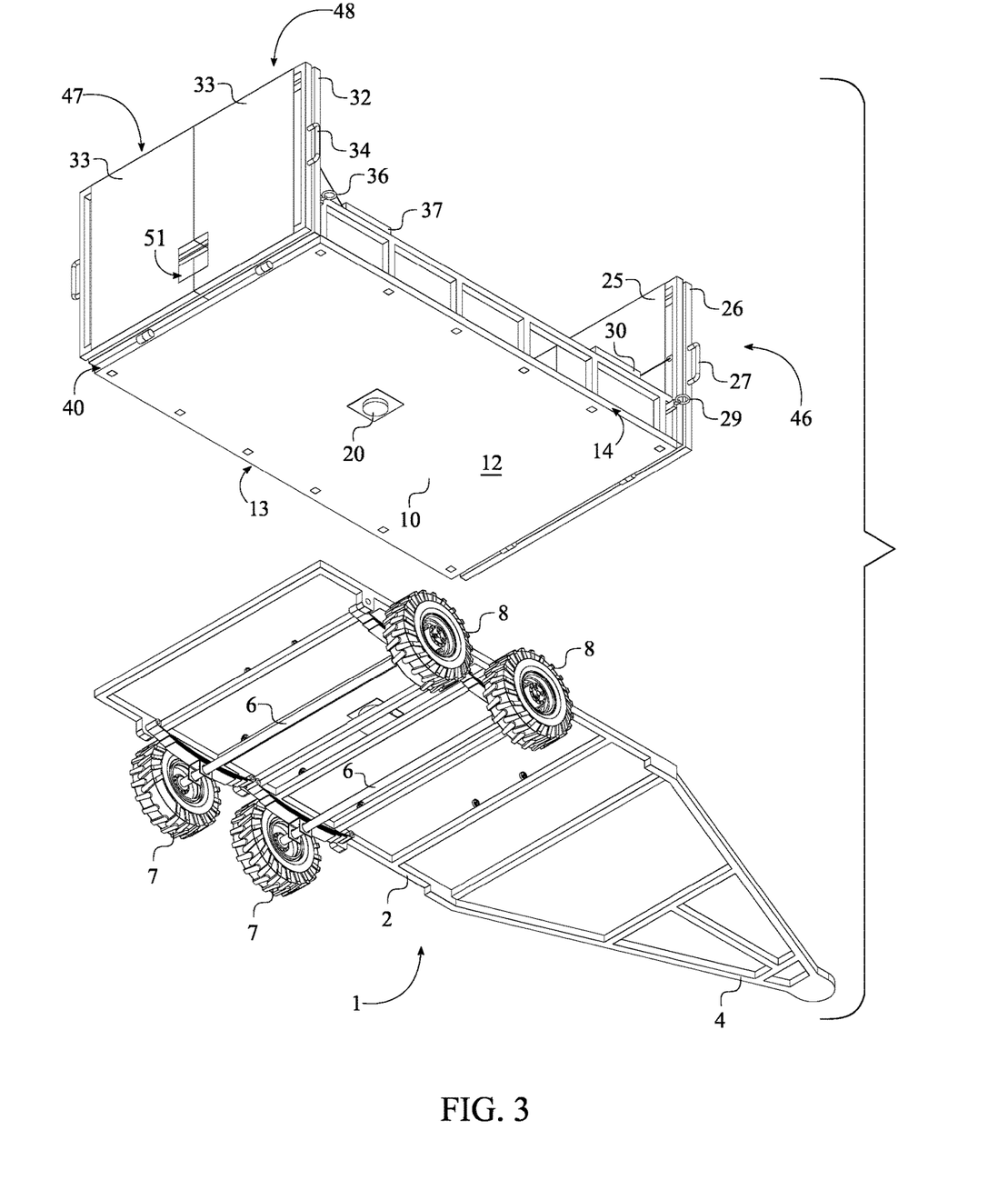
FIG. 3 is a bottom perspective exploded view of the present invention.
Figure 4:
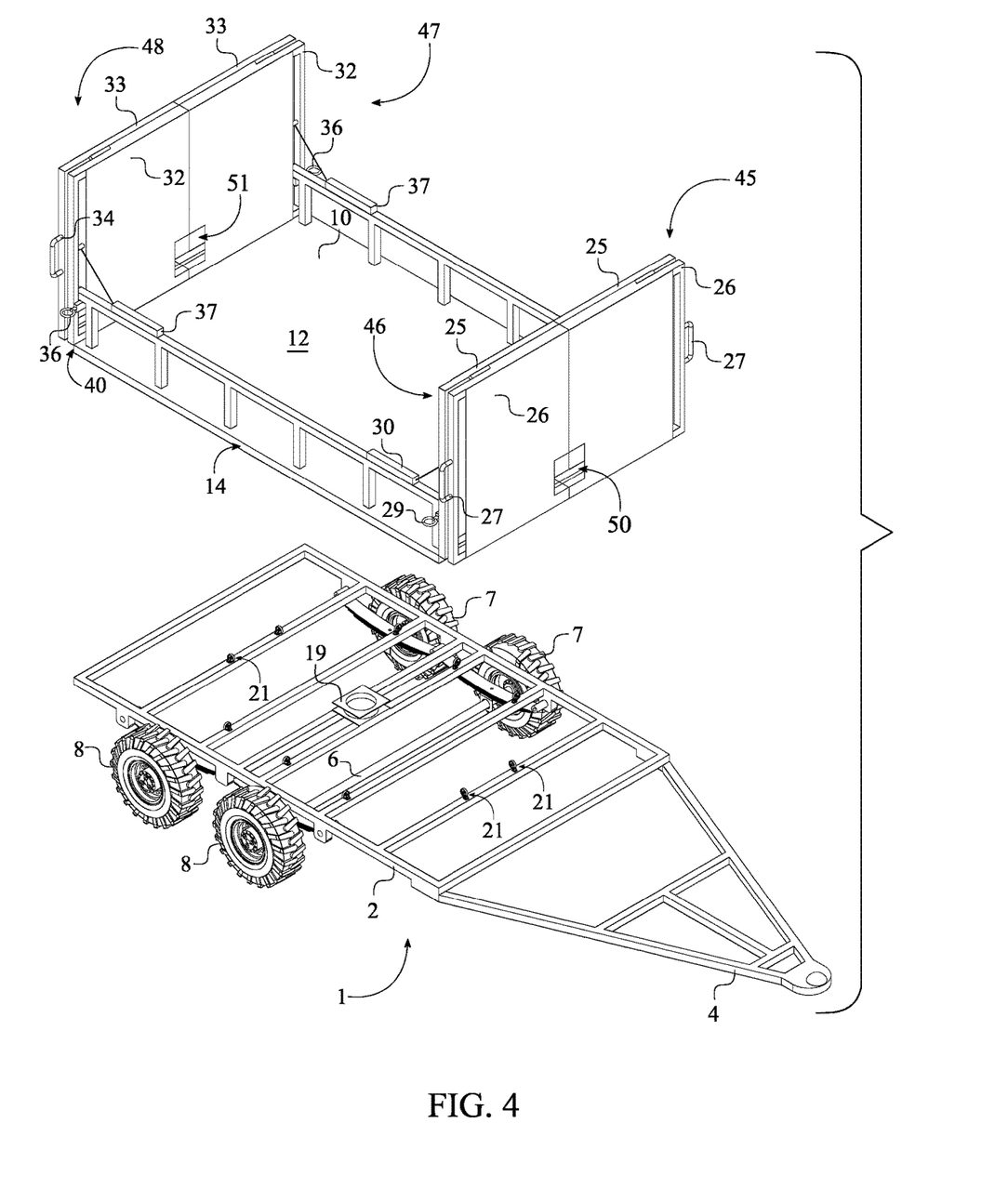
FIG. 4 is a top perspective exploded view of the present invention.
Figure 5:
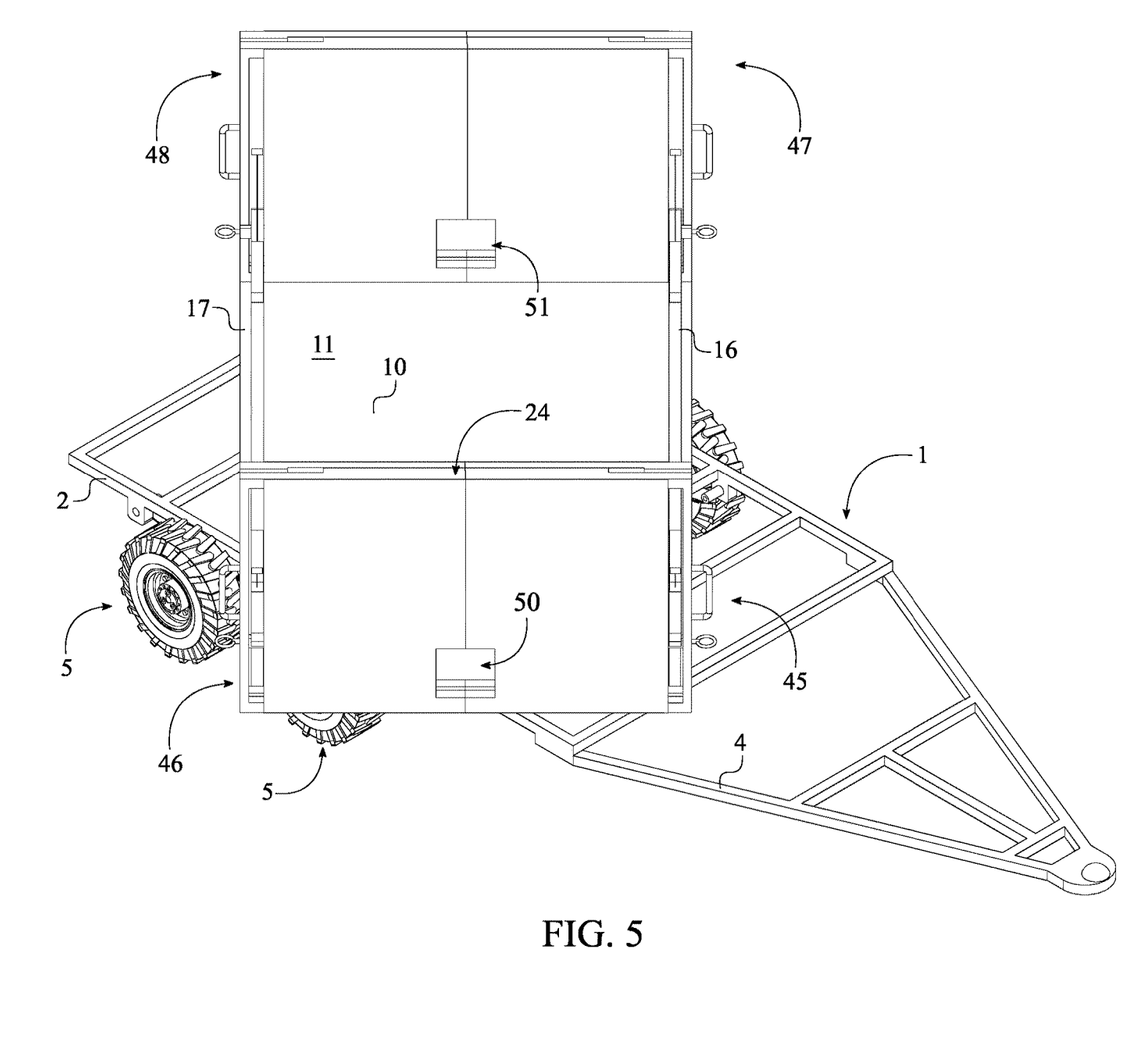
FIG. 5 is a perspective view of the present invention, wherein the first front foldable door and the second front foldable door are positioned away from the front end of the frame as the trailer bed is rotated about the frame.
Figure 6:
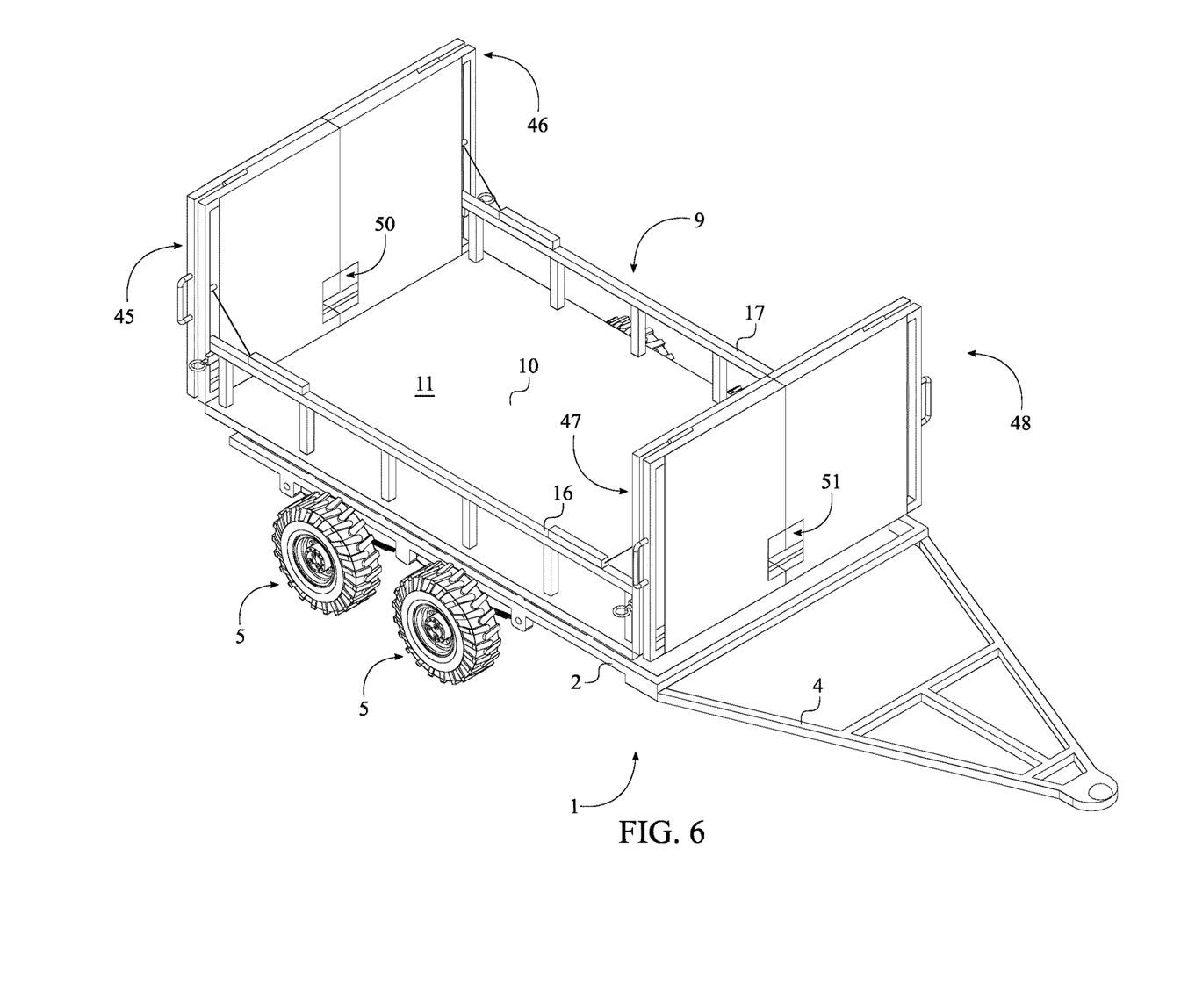
FIG. 6 is a perspective view of the present invention, wherein the first rear foldable door and the second rear foldable door are positioned adjacent and parallel to the front end of the frame.

The present invention is a rotatable trailer bed that can rotate 360-degrees as shown in FIG. 5-6. As a result, the present invention is able to provide efficient process of loading or unloading cargo with respect to the surrounding environment. Furthermore, the present invention also provides an easier method of loading and unloading certain type of cargo such as motorcycles. For example, when a motorcycle is unloaded, the trailer can be rotated 180 degrees to ride off the motorcycle from the trailer thus eliminate the backway pushing of the motorcycle. The present invention comprises a frame 1, a trailer bed 9, a turntable swivel assembly 18, and a plurality of swivel casters 21 as shown in FIG. 1-2. The frame 1 comprises a bed section 2, a hitch section 4, and two wheel sets 5 as shown in FIG. 2-4. In reference to the general configuration of the present invention, the hitch section 4 is adjacently connected a front end 3 of the bed section 2 so that the present invention can be engaged with the towing vehicle. The two wheel sets 5 is rotatably mounted to the bed section 2 so that the two wheel sets 5 is able to provide a mean of transportation. The plurality of swivel casters 21 is mounted to the bed section 2 and perimetrically positioned around the bed section 2. as a result, the plurality of swivel casters 21 is able to reduce the rotational friction of the trailer bed 9 and structurally support the trailer bed 9 during rotation process. The trailer bed 9 that provides a surface area to load cargo is rotatably mounted to the bed section 2 through the turntable swivel assembly 18. As a result, the trailer bed 9 can be rotated 360-degrees around the turntable swivel assembly 18 to ease the loading and unloading of cargo.

Figure 7:
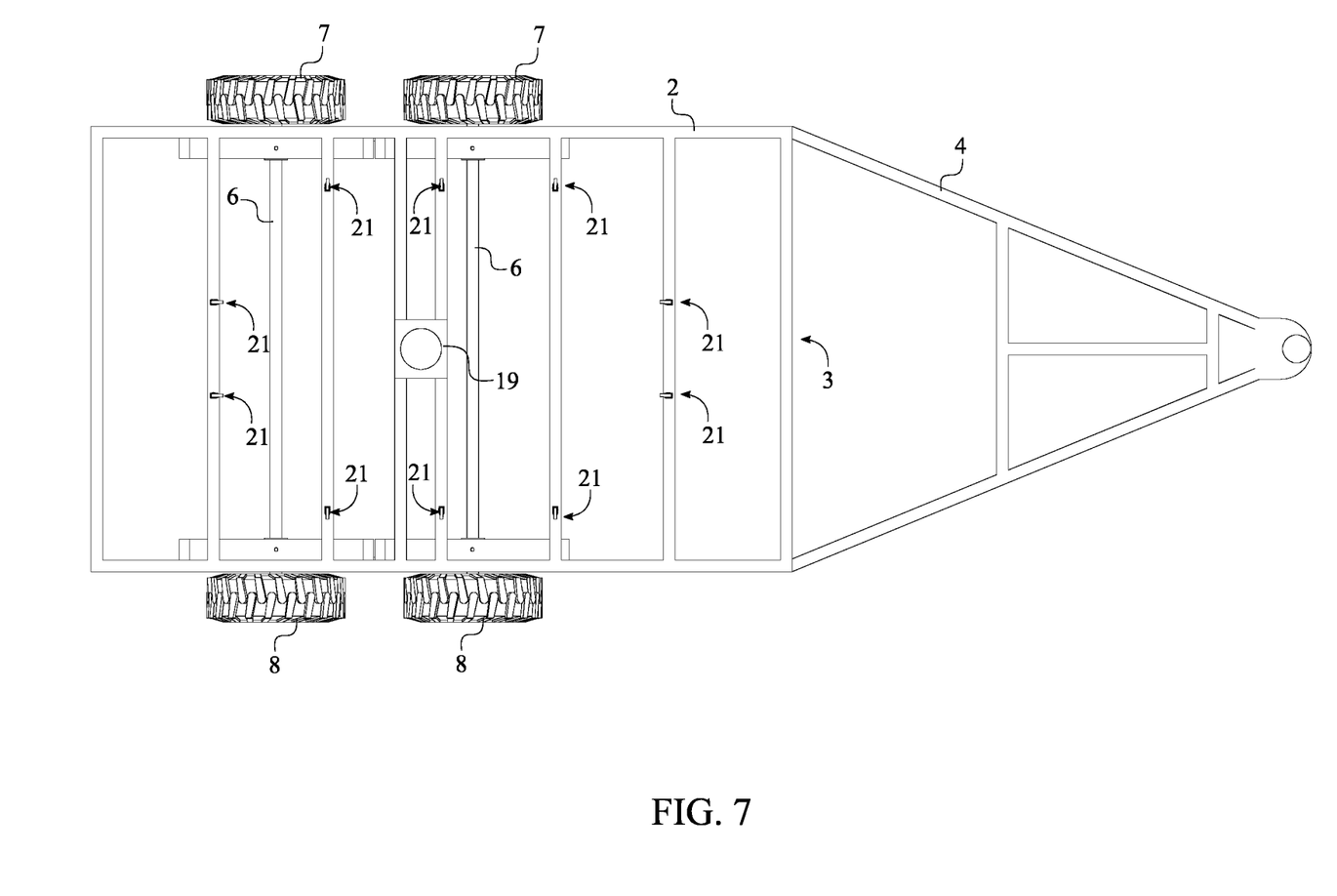
FIG. 7 is a top view of the frame, the turntable swivel assembly, and the plurality of swivel casters.

The frame 1 provides the necessary structural body for the present invention so that the rest of the components can be mounted. In reference to FIG. 7, the bed section 2 is preferably a rectangular shape to accommodate the shape of the trailer bed 9. The hitch section 4 that is connected to the front end 3 of the bed section 2 is preferably formed into a A-frame 1 structure so that the present invention can be hitched/coupled to the towing vehicle. Preferably, the hitch section 4 utilized a coupler body to engaged with a ball mount of the towing vehicle. Furthermore, the hitch section 4 also provide surface area to mount other standard trailer equipment. More specifically, the present invention can comprise a winch mechanism, a trailer jack, a storage box, at least one safety chain, and a breakaway system. The winch mechanism is used to either extract disabled or immobilized vehicles as a cable of the winch mechanism is able to pull the extract disabled or immobilized vehicles. The winch mechanism is preferably connected onto the hitch section 4. The winch mechanism can be electrically powered through the towing vehicle or standalone battery depending upon different embodiment of the present invention. The trailer jack is used to raise and stabilize frame 1 so the present invention can be easily attached to the towing vehicle. The trailer jack is connected to the hitch section 4 and positioned normal to the ground level. The storage box is utilized for storage purpose so that towing related accessories such as ratchet straps, protective covers, tools, wheel jacks, and other related equipment can be stored. The storage box is connected onto the hitch section 4 thus providing easy access to the user. The at least one safety chain is connected to the hitch section 4 and functions as a safety guide to maintain and control a safe stopping point in the event that the event of the ball or coupler failure. The breakaway system is mounted to the hitch section 4 to bring the present invention to a safe stop by activating the electric brakes on the two wheel sets 5, should the present invention be disconnected from the towing vehicle while driving.

The two wheel sets 5 functions as the mean of transportation and comprises an axle 6, a left wheel assembly 7, and a right wheel assembly 8. In reference to FIG. 7, the axle 6 is rotatably mounted across the bed section 2 so that the axle 6 can be freely rotated about a rotational axis of the axle 6. The left wheel assembly 7 is terminally mounted to the axle 6. The right wheel assembly 8 is terminally mounted to the axle 6. The left wheel assembly 7 and the right wheel assembly 8 are oppositely positioned of each other about the axle 6 thus functioning a beam axle 6 system or straight axle 6 system. Furthermore, the left wheel assembly 7 and the right wheel assembly 8 are able to simultaneously rotate about the rotational axis in order to support heavy cargo loads.

In reference to FIGS. 2, 5, and 6, the trailer bed 9 provides the surface area to load the cargo and comprises a base floor 10, a first side rail 16, and a second side rail 17. The base floor 10 is preferably formed into a rectangular body to match with the bed section 2. The base floor 10 is positioned atop the bed section 2 so that the trailer bed 9 can be rotated about the turntable swivel assembly 18. The first side rail 16 is removably mounted along a top surface 11 of the base floor 10 and adjacently positioned to a left end 13 of the base floor 10 as shown in FIG. 4. The second side rail 17 is removably mounted along the top surface 11 of the base floor 10 and adjacently positioned to a right end 14 of the base floor 10 as shown in FIG. 4. The first side rail 16 and the second side rail 17s function as vertical side panels to the base floor 10 and create storage depth into the trailer bed 9.

The turntable swivel assembly 18 that enables the trailer bed 9 to rotate 360-degrees comprises a stator 19 and a rotor 20. In reference to FIG. 2-3, the rotor 20 is concentrically engaged with the stator 19 thus allowing the rotor 20 to freely rotate. More specifically, the stator 19 is adjacently mounted onto the bed section 2 and functions as a stationary body. The rotor 20 is adjacently mounted to a bottom surface 12 of the base floor 10 and functions as a rotatable body so that the trailer bed 9 can be rotated through the turntable swivel assembly 18. The present invention can implement any type of industry standard turntables as the turntable swivel assembly 18 to rotatably mount the trailer bed 9.

Figure 10:
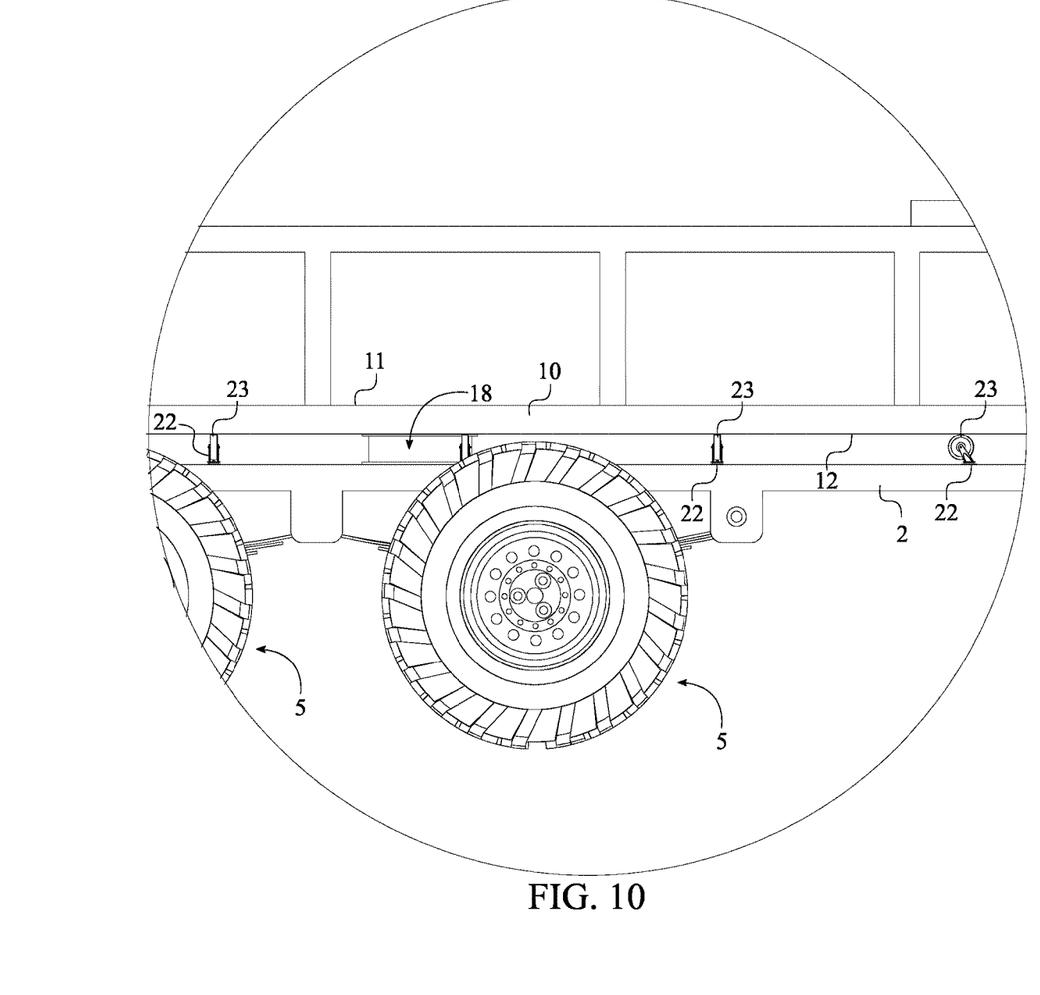
FIG. 10 is a detailed sectional view of the present invention showing the components of each of the plurality of swivel casters.

The plurality of swivel casters 21 is utilized to distribute the weight of the trailer and cargo during rotation process. As a result, the plurality of swivel casters 21 is able to minimize the load applied to the turntable swivel assembly 18. Preferably, the plurality of swivel casters 21 is radially positioned around the turntable swivel assembly 18 so that the total weight of the trailer bed 9 can be equally distributed during the rotation of the trailer bed 9. In reference to FIG. 10, each of the plurality of swivel casters 21 comprises a swivel bracket 22 and a wheel 23. The swivel bracket 22 is mounted to the bed section 2 so that the swivel bracket 22 is able to rotate 360-degrees about a bracket rotational axis of the swivel bracket 22. The wheel 23 is rotatably mounted to the swivel bracket 22 and oriented towards the bottom surface 12 of the base floor 10. As a result, the plurality of swivel casters 21 is able to support and stabilize the trailer bed 9 when the trailer bed 9 rotates about the turntable swivel assembly 18.

Figure 9:
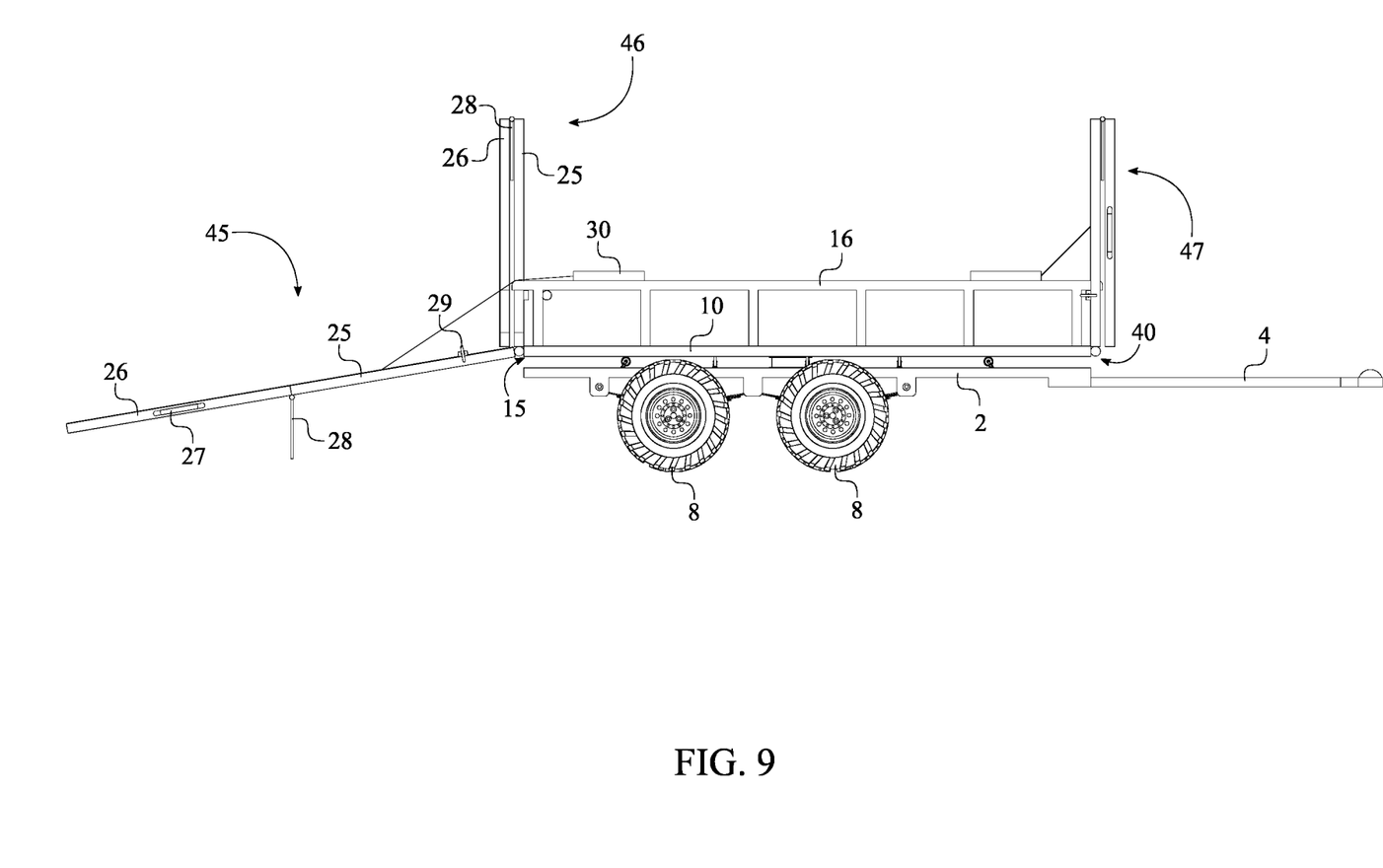
FIG. 9 is a side view of the present invention, wherein the first front foldable door is at the unfolded position and the second front foldable door is at the folded position.

In reference to FIG. 6 and FIG. 9, in some embodiment of the present invention further comprises a first front foldable door 45 and a second front foldable door 46. The first front foldable door 45 is utilized to cover a first half of the front opening that is delineated by a front edge 15 of the base floor 10 and the first side rail 16. In other words, the first front foldable door 45 is hingedly connected to the front edge 15 of the base floor 10 and is adjacently positioned to the left end 13 so that the user can easily open and close the first front foldable door 45 to access the first half of the front opening. Similarly, the second front foldable door 46 is utilized to cover a second half of the front opening that is delineated by the front edge 15 of the base floor 10 and the second side rail 17. In other words, the second front foldable door 46 is hingedly connected to the front edge 15 of the base floor 10 and is adjacently positioned to the right end 14 so that the user can easily open and close the second front foldable door 45 to access the second half of the front opening. Furthermore, the first front foldable door 45 and the second front foldable door 46 are able to operate independent of each other thus allowing two separate access/exit openings for the trailer bed 9.

Furthermore, the first front foldable door 45 and the second front foldable door 46 each comprises a first front panel 25, a second front panel 26, at least one front handle 27, a front leg 28, a front locking mechanism 29, and a front slow-release mechanism 30 as shown in FIG. 9. The first front panel 25 is hingedly mounted to the front edge 15 of the base floor 10. The second front panel 26 is hingedly mounted to the first front panel 25. As a result, the first front panel 25 and the second front panel 26 are able to function as a gate when the first half or the second half of the front opening is closed or function as a loading ramp when the first half or the second half of the front opening is opened. The at least one front handle 27 is connected to the second front panel 26 and outwardly extended from the second front panel 26 thus allowing the user to easily operate the first front foldable door 45 or the second front foldable door 46 between a folded position and an unfolded position. The front leg 28 is foldably connected to the first front panel 25. When the first front foldable door 45 or the second foldable door 46 is in the folded position, the front leg 28 is sandwiched in between the first front panel 25 and the second front panel 26. When the first front foldable door 45 or the second front foldable door 46 is in the unfolded position, the front leg 28 is positioned normal to the ground level and functions as a supporting structure to the front foldable door 45. The front locking mechanism 29 is connected to the first front panel 25 so that the first front panel 25 can be secured to the trailer bed 9 during transportation. Preferably, the present invention utilized a spring-loaded latch or pin locking mechanism as the front locking mechanism 29. However, the front locking mechanism 29 is not limited to the spring-loaded latch or pin locking mechanism and can be any other types of industry standard locking mechanisms. The front slow-release mechanism 30 is integrated in between the trailer bed 9 and the first front panel 25 so that the first front foldable door 45 and the second front foldable door 46 can slowly unfold. The present invention preferably utilizes a spring-tensioned cable apparatus as the front slow-release mechanism 30 to ease the opening and closing of the first front foldable door 45 and the second front foldable door 46. More specifically, a first spring-tensioned cable apparatus is connected between the first side rail 16 and the first front panel 25 to support the weight of the first front foldable door 45. A second spring-tensioned cable apparatus of the pair of spring-tensioned cable apparatus is connected between the second side rail 17 and the first front panel 25 to support the weight of the second front foldable door 46.

Figure 8:
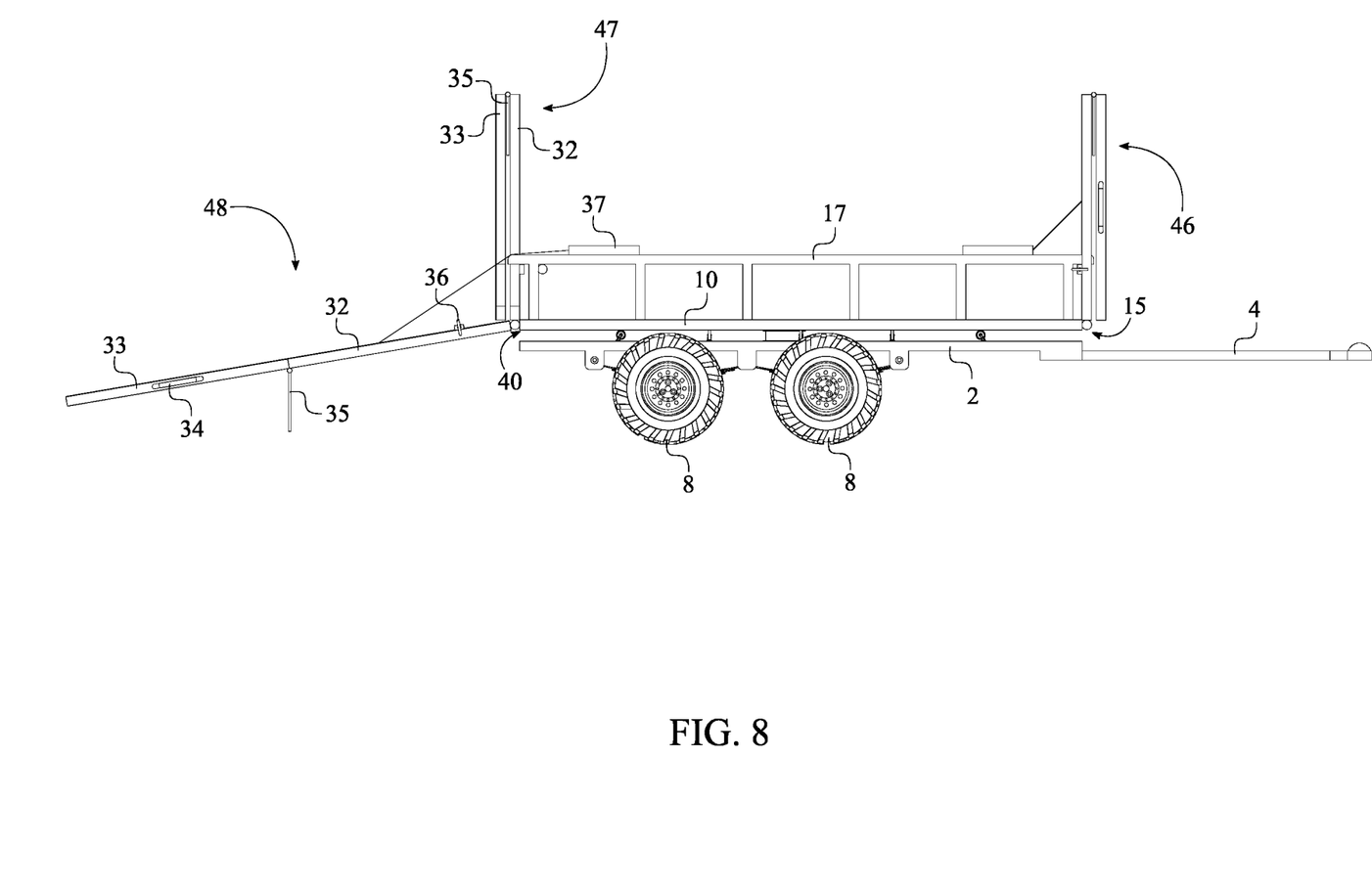
FIG. 8 is a side view of the present invention, wherein the first rear foldable door is at the folded position and the second rear foldable door is at the unfolded position.

In reference to FIG. 6 and FIG. 8, in some embodiment of the present invention further comprises a first rear foldable door 47 and a second rear foldable door 48. The first rear foldable door 47 is utilized to cover a first half of the rear opening that is delineated by a rear edge 40 of the base floor 10 and the first side rail 16. In other words, the first rear foldable door 47 is hingedly connected to the rear edge 40 of the base floor 10 and is adjacently positioned to the left end 13 so that the user can easily open and close the first rear foldable door 47 to access the first half of the rear opening. Similarly, the second rear foldable door 48 is utilized to cover a second half of the rear opening that is delineated by the rear edge 40 of the base floor 10 and the second side rail 17. In other words, the second rear foldable door 48 is hingedly connected to the rear edge 40 of the base floor 10 and is adjacently positioned to the right end 14 so that the user can easily open and close the second rear foldable door 47 to access the second half of the rear opening. Furthermore, the first rear foldable door 47 and the second rear foldable door 48 are able to operate independent of each other thus allowing two separate access/exit openings for the trailer bed 9.

Furthermore, the first rear foldable door 47 and the second rear foldable door 48 each comprises a first rear panel 32, a second rear panel 33, at least one rear handle 34, a rear leg 35, a rear locking mechanism 36, and a rear slow-release mechanism 37 as shown in FIG. 8. The first rear panel 32 is hingedly mounted to the rear edge 40 of the base floor 10. The second rear panel 33 is hingedly mounted to the first rear panel 32. As a result, the first rear panel 32 and the second rear panel 33 are able to function as a gate when the first half or the second half of the rear opening is closed or function as a loading ramp when the first half or the second half of the rear opening is opened. The at least one rear handle 34 is connected to the second rear panel 33 and outwardly extended from the second rear panel 33 thus allowing the user to easily operate the first rear foldable door 47 or the second rear foldable door 48 between a folded position and an unfolded position. The rear leg 35 is foldably connected to the first rear panel 32. When the first rear foldable door 47 or the second rear foldable door 48 is in the folded position, the rear leg 35 is sandwiched in between the first rear panel 32 and the second rear panel 33. When the first rear foldable door 47 or the second rear foldable door 48 is in the unfolded position, the rear leg 35 is positioned normal to the ground level and functions as a supporting structure to the rear foldable door 47. The rear locking mechanism 36 is connected to the first rear panel 32 so that the first rear panel 32 can be secured to the trailer bed 9 during transportation. Preferably, the present invention utilized a spring-loaded latch or pin locking mechanism as the rear locking mechanism 36. However, the rear locking mechanism 36 is not limited to the spring-loaded latch or pin locking mechanism and can be any other types of industry standard locking mechanisms. The rear slow-release mechanism 37 is integrated in between the trailer bed 9 and the first rear panel 32 so that the first rear foldable door 47 and the second rear foldable door 48 can slowly unfold. The present invention preferably utilizes a spring-tensioned cable apparatus as the rear slow-release mechanism 37 to ease the opening and closing of the first rear foldable door 47 and the second rear foldable door 48. More specifically, a first spring-tensioned cable apparatus is connected between the first side rail 16 and the first rear panel 32 to support the weight of the first rear foldable door 47. A second spring-tensioned cable apparatus of the pair of spring-tensioned cable apparatus is connected between the second side rail 17 and the first rear panel 32 to support the weight of the second rear foldable door 48.

Figure 11:
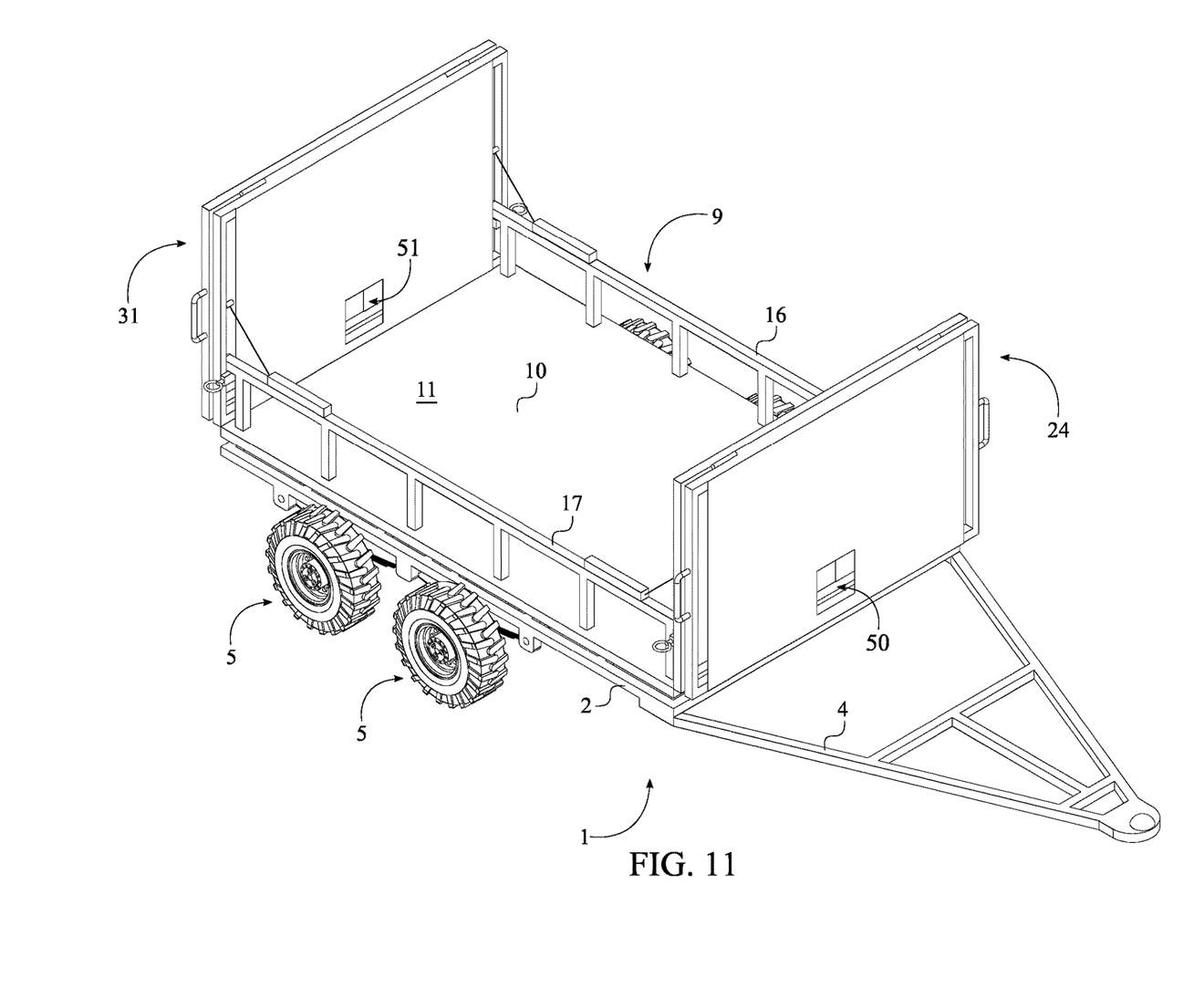
FIG. 11 is a perspective view of the present invention, showing the front foldable door and the rear foldable door.
Figure 12:
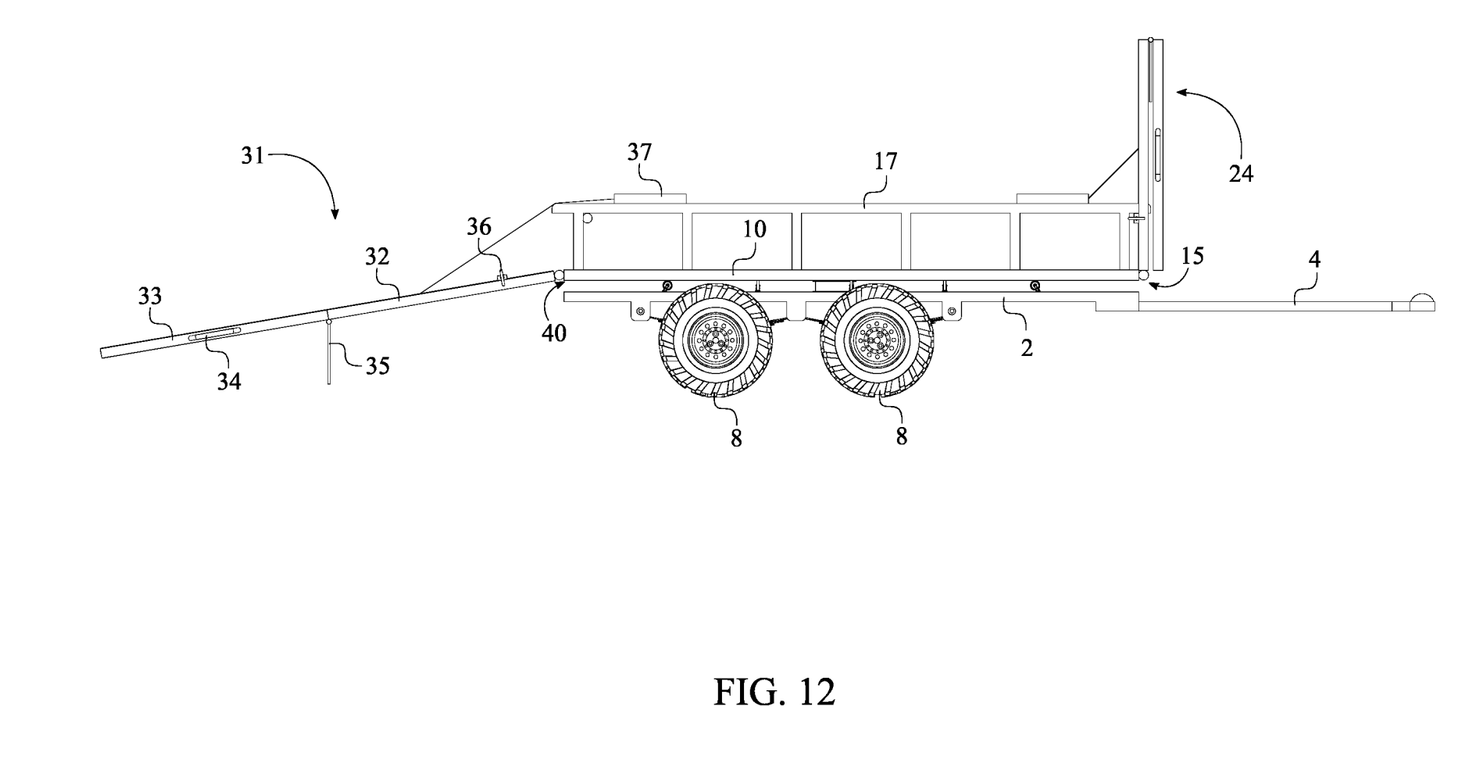
FIG. 12 is a side view of the present invention, wherein the rear foldable door is at the unfolded position and the front foldable door is at the folded position.
Figure 13:
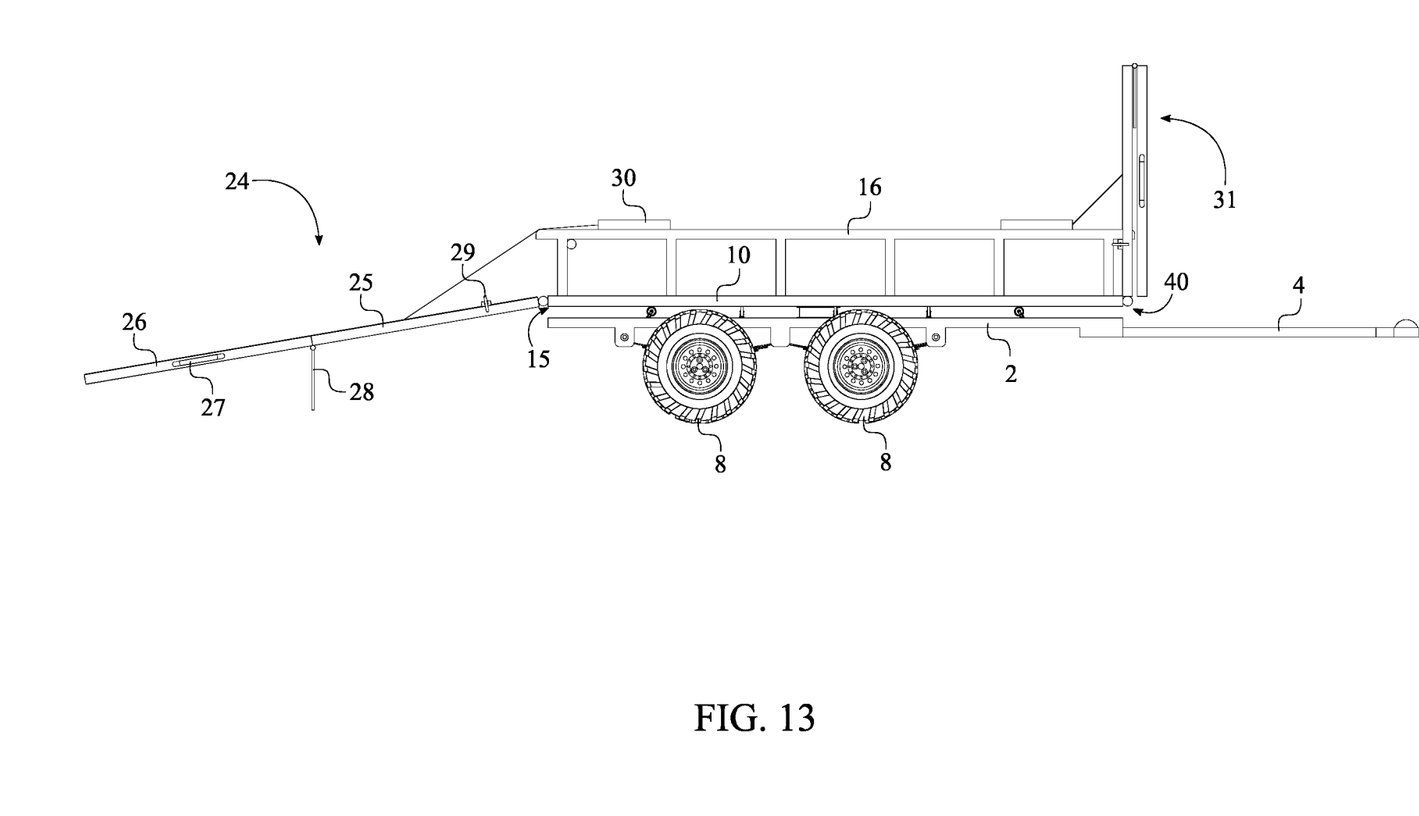
FIG. 13 is a side view of the present invention, wherein the front foldable door is at the unfolded position and the rear foldable door is at the folded position.

In reference to FIG. 11-13, in some embodiment of the present invention further comprises a front foldable door 24. The front foldable door 24 is utilized to cover a front opening that is delineated by the front edge 15 of the base floor 10, the first side rail 16, and the second side rail 17. In other words, the front foldable door 24 is hingedly connected to the front edge 15 of the base floor 10 so that the user can easily open and close the front foldable door 24 to access the front opening. Furthermore, the front foldable door 24 comprises the first front panel 25, the second front panel 26, the at least one front handle 27, the front leg 28, the front locking mechanism 29, and the front slow-release mechanism 30. The first front panel 25 is hingedly mounted to the front edge 15 of the base floor 10. The second front panel 26 is hingedly mounted to the first front panel 25. As a result, the first front panel 25 and the second front panel 26 are able to fold in half and function as a gate when the front opening is closed or function as a loading ramp when the front opening is opened. The at least one front handle 27 is connected to the second front panel 26 and outwardly extended from the second front panel 26 thus allowing the user to easily operate the front foldable door 24 between the folded position and the unfolded position. The front leg 28 is foldably connected to the first front panel 25. When the front foldable door 24 is in the folded position, the front leg 28 is sandwiched in between the first front panel 25 and the second front panel 26. When the front foldable door 24 is in the unfolded position, the front leg 28 is positioned normal to the ground level and functions as a supporting structure to the front foldable door 24. The front locking mechanism 29 is connected to the first front panel 25 so that the first front panel 25 can be secured to the trailer bed 9 during transportation. Preferably, the present invention utilized a spring-loaded latch or pin locking mechanism as the front locking mechanism 29. However, the front locking mechanism 29 is not limited to the spring-loaded latch or pin locking mechanism and can be any other types of industry standard locking mechanisms. The front slow-release mechanism 30 is integrated in between the trailer bed 9 and the first front panel 25 so that the front foldable door 24 can slowly unfold. The present invention preferably utilizes a pair of spring-tensioned cable apparatus as the front slow-release mechanism 30 to ease the opening and closing of the front foldable door 24. More specifically, a first spring-tensioned cable apparatus of the pair of spring-tensioned cable apparatus is connected between the first side rail 16 and the first panel. A second spring-tensioned cable apparatus of the pair of spring-tensioned cable apparatus is connected between the second side rail 17 and the first panel. As a result, the first spring-tensioned cable apparatus and the second spring-tensioned cable apparatus are able to equally distribute the weight of the front foldable door 24 during the opening and closing process to assist the user.

In reference to FIG. 11-13, in some embodiment of the present invention further comprises a rear foldable door 31. The rear foldable door 31 is utilized to cover a rear opening that is delineated by the rear edge 40 of the base floor 10, the first side rail 16, and the second side rail 17. In other words, the rear foldable door 31 is hingedly connected to the rear edge 40 of the base floor 10 so that the user can easily open and close the rear foldable door 31 to access the rear opening. Furthermore, the rear foldable door 31 comprises the first rear panel 32, the second rear panel 33, the at least one rear handle 34, the rear leg 35, the rear locking mechanism 36, and the rear slow-release mechanism 37. The first rear panel 32 is hingedly mounted to the rear edge 40 of the base floor 10. The second rear panel 33 is hingedly mounted to the first rear panel 32. As a result, first rear panel 32 and second rear panel 33 are able to fold in half and function as a gate when the rear opening is closed or functions as a loading ramp when the rear opening is opened. The at least one rear handle 34 is connected to the second rear panel 33 and outwardly extended from the second rear panel 33 thus allowing the user to easily operate the rear foldable door 31 between the folded position and the unfolded position. The rear leg 35 is foldably connected to the first rear panel 32. When the rear foldable door 31 is in the folded position, the rear leg 35 is sandwiched in between the first rear panel 32 and the second rear panel 33. When the rear foldable door 31 is in the unfolded position, the rear leg 35 is positioned normal to the ground level and functions as a supporting structure to the rear foldable door 31. The rear locking mechanism 36 is connected to the first rear panel 32 so that the first rear panel 32 can be secured to the trailer bed 9 during transportation. Preferably, the present invention utilized a spring-loaded latch or pin locking mechanism as the rear locking mechanism 36. However, the rear locking mechanism 36 is not limited to the spring-loaded latch or pin locking mechanism and can be any other types of industry standard locking mechanisms. The rear slow-release mechanism 37 is integrated in between the trailer bed 9 and the first rear panel 32 so that the rear foldable door 31 can slowly unfold. The present invention preferably utilizes a pair of spring-tensioned cable apparatus as the rear slow-release mechanism 37 to ease the opening and closing of the rear foldable door 31. More specifically, a first spring-tensioned cable apparatus of the pair of spring-tensioned cable apparatus is connected between the first side rail 16 and the first panel. A second spring-tensioned cable apparatus of the pair of spring-tensioned cable apparatus is connected between the second side rail 17 and the first panel. As a result, the first spring-tensioned cable apparatus and the second spring-tensioned cable apparatus are able to equally distribute the weight of the rear foldable door 31 during the opening and closing process to assist the user.

The present invention can further comprise a front opening 50 and a rear opening 51 as shown in FIG. 1 and FIG. 6. More specifically, the front opening 50 traverses through the first front panel 25 and the second front panel 26 and positioned adjacent to the base floor 10 so that the cable of the winch mechanism can be inserted through the first front foldable door 45 and the second front foldable door 46 when the corresponding foldable door is in the folded position. Similarly, the rear opening 51 traverses through the first rear panel 32 and the second rear panel 33 and positioned adjacent to the base floor 10 so that the cable of the winch mechanism can be inserted through the first rear foldable door 47 and the second rear foldable door 47 when the corresponding foldable door is in the folded position.

The present invention is also equipped with other standard trailer accessories and trailer features to improve the functionality and safety. For example, the present invention comprises a turn lights and brake lights system to improve the safety measures of the present invention.

Although the invention has been explained in relation to its preferred embodiment, it is to be understood that many other possible modifications and variations can be made without departing from the spirit and scope of the invention as hereinafter claimed.

What is claimed is:

1. A rotatable trailer bed comprising:
    a frame;
    a trailer bed;
    a turntable swivel assembly;
    a plurality of swivel casters;
    the frame comprising a bed section, a hitch section, and two wheel sets;
    the hitch section being adjacently connected a front end of the bed section;
    the two wheel sets being rotatably mounted to the bed section;
    the plurality of swivel casters being mounted to the bed section;
    the plurality of swivel casters being perimetrically positioned around the bed section;
    the trailer bed being rotatably mounted to the bed section through the turntable swivel assembly;
    a first front foldable door;
    a second front foldable door;
    the trailer bed comprising a base floor;
    the first front foldable door being hingedly connected to a front edge of the base floor;
    the first front foldable door being adjacently positioned to a left end of the base floor;
    the second front foldable door being hingedly connected to a front edge of the base floor; and
    the second front foldable door being adjacently positioned to a right end of the base floor.

2. The rotatable trailer bed as claimed in claim 1 comprising:
    the two wheel sets comprising an axle, a left wheel assembly, and a right wheel assembly;
    the axle being rotatably mounted across the bed section;
    the left wheel assembly being terminally mounted to the axle;
    the right wheel assembly being terminally mounted to the axle; and
    the left wheel assembly and the right wheel assembly being oppositely positioned of each other about the axle.

3. The rotatable trailer bed as claimed in claim 1 comprising:

the trailer bed comprising a base floor, a first side rail, and a second side rail;

the first side rail being removably mounted along a top surface of the base floor;

the first side rail being adjacently positioned to a left end of the base floor;

the second side rail being removably mounted along the top surface of the base floor; and the second side rail being adjacently positioned to a right end of the base floor.

4. The rotatable trailer bed as claimed in claim 1 comprising:

the turntable swivel assembly comprising a stator and a rotor;

the trailer bed comprising a base floor;

the stator being adjacently mounted onto the bed section; and the rotor being adjacently mounted to a bottom surface of the base floor.

5. The rotatable trailer bed as claimed in claim 1 comprising:

each of the plurality of swivel casters comprising a swivel bracket and a wheel;

the trailer bed comprising a base floor;

the swivel bracket being mounted to the bed section;

the wheel being rotatably mounted to the swivel bracket; and the wheel being oriented towards a bottom surface of the base floor.

6. The rotatable trailer bed as claimed in claim 1 comprising:

the first front foldable door and the second front foldable door each comprising a first front panel, a second front panel, at least one front handle, a front leg, a front locking mechanism, and a front slow-release mechanism;

the first front panel being hingedly mounted to the front edge of the base floor;

the second front panel being hingedly mounted to the first front panel;

the at least one front handle being connected to the second front panel;

the front leg being foldably connected to the first front panel;

the front locking mechanism being connected to the first front panel; and the front slow-release mechanism being integrated in between the trailer bed and the first front panel.

7. A rotatable trailer bed comprising:

a frame;

a trailer bed;

a turntable swivel assembly;

a plurality of swivel casters;

the frame comprising a bed section, a hitch section, and two wheel sets;

the hitch section being adjacently connected a front end of the bed section;

the two wheel sets being rotatably mounted to the bed section;

the plurality of swivel casters being mounted to the bed section;

the plurality of swivel casters being perimetrically positioned around the bed section;

a first rear foldable door;

a second rear foldable door;

the trailer bed comprising a base floor;

the first rear foldable door being hingedly connected to a rear edge of the base floor;

the first rear foldable door being adjacently positioned to a left end of the base floor;

the second rear foldable door being hingedly connected to a rear edge of the base floor; and the second rear foldable door being adjacently positioned to a right end of the base floor.

8. The rotatable trailer bed as claimed in claim 7 comprising:

the first rear foldable door and the second rear foldable door each comprising a first rear panel, a second rear panel, at least one rear handle, a rear leg, a rear locking mechanism, and a rear slow-release mechanism;

the first rear panel being hingedly mounted to the rear edge of the base floor;

the second rear panel being hingedly mounted to the first rear panel;

the at least one rear handle being connected to the second rear panel;

the rear leg being foldably connected to the first rear panel;

the rear locking mechanism being connected to the first rear panel; and the rear slow-release mechanism being integrated in between the trailer bed and the first rear panel.

\* \* \* \* \*